United States Patent [19]

Dickore et al.

[11] 3,907,543

[45] Sept. 23, 1975

[54] 4-AMINO-1,2,4-TRIAZINE-5-ONE NOVEL COMPOUNDS, A PROCESS FOR THEIR PRODUCTION AND HERBICIDAL COMPOSITIONS

[75] Inventors: Karlfried Dickore, Leverkusen; Wilfried Draber, Wuppertal-Elberfeld; Ludwig Eue, Cologne, all of Germany

[73] Assignee: Bayer Aktiengesellschaft, Leverkusen, Germany

[22] Filed: Oct. 29, 1973

[21] Appl. No.: 410,668

Related U.S. Application Data

[62] Division of Ser. No. 224,966, Feb. 9, 1972, Pat. No. 3,847,914.

[30] Foreign Application Priority Data

Feb. 18, 1971  Germany............................ 2107757

[52] U.S. Cl. .................................................. 71/93
[51] Int. Cl.² ............................................ A01N 9/22
[58] Field of Search ........................................ 71/93

[56] References Cited
UNITED STATES PATENTS

| | | | |
|---|---|---|---|
| 3,544,570 | 12/1970 | Timmler et al. .................... | 71/93 |
| 3,671,523 | 6/1972 | Westphal et al. .................... | 71/93 |
| 3,752,808 | 8/1973 | Jaulelat et al ..................... | 71/93 |

*Primary Examiner*—James O. Thomas, Jr.
*Attorney, Agent, or Firm*—Burgess, Dinklage & Sprung

[57] ABSTRACT

Certain novel 4-amino-1,2,4-triazine-5-one compounds of the formula:

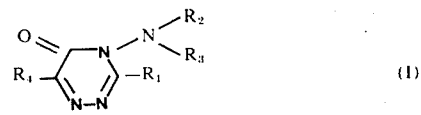

in which
R₁ and R₄ are hydrogen, alkyl, cycloalkyl, substituted phenyl or phenyl;
R₂ is hydrogen or alkyl;
R₃ is hydrogen, alkyl, phenyl, haloalkyl, phenylalkyl, or alkylphenyl, alkoxyphenyl or alkylmercaptophenyl;

are prepared by a novel process comprising reacting a glyoxylic acid ester 2-acylhydrazone of the formula

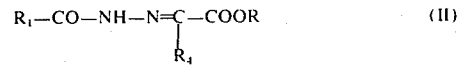

in which
R₁ and R₄ are defined as above, and
R is alkyl of from 1 to 4 carbon atoms,
is reacted with a hydrazine derivative of the formula

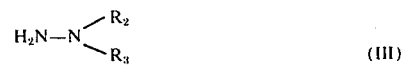

in which
R₂ and R₃ are defined as above,
in the presence of an organic solvent. The novel compounds are outstandingly active as herbicides and are particularly useful as selective herbicides.

31 Claims, No Drawings

4-AMINO-1,2,4-TRIAZINE-5-ONE NOVEL COMPOUNDS, A PROCESS FOR THEIR PRODUCTION AND HERBICIDAL COMPOSITIONS

This is a division of application Ser. No. 224,966, filed Feb. 9, 1972, now U.S. Pat. No. 3,847,914.

The present invention relates to certain new 4-amino-1,2,4-triazine-5-one compounds and to a novel process for their production. In addition, the invention is concerned with herbicidal compositions containing such compounds and to their use as herbicides.

It is known that monohydrazones of α-diketones can be reached with formamide to give 5,6-disubstituted 1,2,4-triazines (Chem. Ber. 87, 1540–1543 (1954)). This process, however, yields no 4-amino derivatives and moreover is restricted to the use of aromatic α-diketone starting materials Also known is the cyclization of C-amino-C'-cyanosubstituted p-nitro-benzaldazines, 1,2,4-triazine-5-ones being formed in which their 3- and 6-position are substituted by the p-nitrophenyl radical (Chem. Ber. 101, 2351–2359 (1968)). According to this process it is likewise fundamentally not possible to prepare 4-amino derivatives. Furthermore, the process does not permit the introduction of any desired alkyl or aryl radicals into 3-and 5-position.

The present invention, in one aspect, provides, 4-amino-1,2,4-triazine-5-one compounds of the formula:

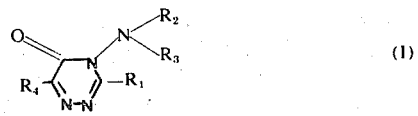

(I)

in which
R$_1$ and R$_4$, which may be the same or different, are hydrogen, alkyl of from 1 to 6 carbon atoms, trifluoromethyl, cycloalkyl of from 3 to 12 ring carbon atoms, phenyl, halophenyl, trifluoromethylphenyl, nitrophenyl, alkylthiophenyl, alkylsulfonylphenyl, cyanalkyl, alkoxyalkyl, alkylphenyl or alkoxyphenyl of from 1 to 4 carbon atoms in the alkyl or alkoxy moiety, or phenylalkyl of from 1 to 3 carbon atoms in the alkyl moiety, R$_2$ is hydrogen or alkyl of from 1 to 4 carbon atoms; and R$_3$ is hydrogen, alkyl of from 1 to 4 carbon atoms, phenyl, haloalkyl, trifluormethylalkyl, hydroxyalkyl, phenylalkyl of from 1 to 3 carbon atoms in the alkyl moiety, or alkylphenyl, alkoxyphenyl or alkylmercaptophenyl of from 1 to 4 carbon atoms in the alkyl moiety.

Preferred, because of their high degree of herbicidal activity, are compounds in which R$_1$ is ethyl, iso-propyl, n-propyl, iso-butyl, cyclopropyl or cyclohexyl, and R$_4$ is methyl, ethyl, n-propyl, isopropyl, t-butyl, phenyl or cyclohexyl, in formula (I), above.

The invention also provides a process for the production of a compound of formula (I) in which a glyoxylic acid ester 2-acylhydrazone of the general formula:

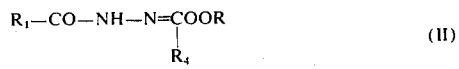

(II)

in which
R$_1$ and R$_4$ are defined as above, and
R is alkyl of from 1 to 4 carbon atoms, preferably methyl or ethyl;

is reacted with a hydrazine derivative of the general formula:

(III)

in which
R$_2$ and R$_3$ are defined as above, in the presence of an organic solvent, and optionally in the presence of a basic catalyst.

The reaction is desirably effected at elevated temperature, in general at from 50° to 150°C.

This cyclization reaction represents a novel and unpredictably workable process. It was decidedly surprising that the reaction took the course stated above. It would have been expected that the glyoxylic acid ester 2-acylhydrazone of the formula (II) would react with hydrazine to give only the acid hydrazide. Moreover, a displacement of the acylhydrazine radical of the compound of formula (II) by the hydrazine, expediently used in excess, would have been probable. In this case, a hydrazone or an azine of the α-oxoesters on which the compound (II) is based, or of the α-oxo-hydrazide concerned would have been predicted as the reaction product.

The process according to the invention therefore allows for the first time the preparation of 4-amino-1,2,4-triazine-5-ones substituted in any desired manner and therefore represents a valuable enrichment of the art.

If t-butylglyoxylic acid methyl ester 2-propionylhydrazone- and hydrazine are used as starting materials, the reaction course can be represented by the following formula scheme:

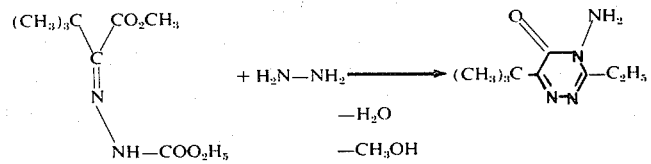

The glyoxylic acid ester 2-acylhydrazones to be used as starting materials are defined generally by the formula (II) above.

Such starting materials were not known prior to this invention and also represent a novel aspect thereof. They can be prepared by reacting a glyoxylic acid ester of the general formula:

(IV)

in which
R and R$_4$ are as above, with an acylhydrazine of the general formula:

$$R_1-CO-NH-NH_2 \quad (V)$$

in which
R$_1$ is as above,
in the presence of an organic solvent, for example an alcohol such as methanol or ethanol, and an acid catalyst, in general at temperatures from 50° to 130°C, as illustrated by the preparative examples, below.

As examples of the glyoxylic acid ester 2-acylhydrazones of the formula (II) which can be used according to the invention, there are mentioned in particular:
- t-butylglyoxylic acid methyl ester 2-formylhydrazone,
- t-butylglyoxylic acid methyl ester 2-acetylhydrazone,
- t-butylglyoxylic acid methyl ester 2-propionylhydrazone,
- t-butylglyoxylic acid methyl ester 2-isobutyrylhydrazone,
- t-butylglyoxylic acid methyl ester 2-n-butyrylhydrazone,
- t-butylglyoxylic acid methyl ester 2-pivalohydrazone,
- t-butylglyoxylic acid methyl ester 2-hexahydrobenzoylhydrazone,
- t-butylglyoxylic acid methyl ester 2-benzoylhydrazone,
- t-butylglyoxylic acid methyl ester 2-trifluoroacetylhydrazone,
- phenylglyoxylic acid methyl ester 2-acetylhydrazone,
- phenylglyoxylic acid methyl ester 2-propionylhydrazone,
- phenylglyoxylic acid methyl ester 2-isobutyrylhydrazone,
- phenylglyoxylic acid methyl ester 2-n-butyrylhydrazone,
- phenylglyoxylic acid methyl ester 2-pivaloyhydrazone,
- phenylglyoxylic acid methyl ester 2-hexahydrobenzoylhydrazone,
- phenylglyoxylic acid ethyl ester 2-hexahydrobenzoylhydrazone,
- phenylglyoxylic acid methyl ester 2-trifluoroacetylhydrazone, The hydrazine derivative used as starting materials are defined by the formula (III). These hydrazine derivatives are known. An example is unsubstituted hydrazine itself, which can be used anhydrous or as a hydrate.

The organic solvent used as diluent for the reaction of the glyoxylic acid ester 2-acylhydrazones (II) with the hydrazine derivatives (III) is preferably an aprotic, higher-boiling, organic solvent which cannot react with hydrazine. Examples include pyridine, α-picoline, xylene and quinoline.

The reaction according to the invention can be carried out in the presence of a basic catalyst, that is an inorganic or organic base, higher yields being then frequently attained. Suitable catalysts include especially potassium hydroxide, sodium hydroxide, potassium tert.-butylate, triethylamine, dimethylbenzylamine, N-methyl-morpholine and other tertiary organic bases. Preferably, potassium hydroxide is used. In the case of the reaction of glyoxylic acid ester 2-acylhydrazone with unsubstituted hydrazine, the amount of potassium hydroxide which dissolves to give saturation in hydrazine hydrate is expediently used.

The reaction temperatures can be varied within a fairly wide range. In general, the reaction is carried out at 50° to 150°C, preferably 80° to 120°C.

When carrying out the process, the glyoxylic acid ester 2-acylhydrazone (II) is expediently reacted with an excess of the hydrazine (III). If desired, however, the equivalent amount of hydrazine can be used.

In a preferred embodiment of the process, a solution of the glyoxylic acid ester 2-acylhydrazone (II) and the hydrazine (III) in a solvent such as pyridine is stirred for some hours at elevated temperature, for example at 100°C.

The working up may take place in customary manner, for example by concentration, washing with water and recrystallization. If an appropriate solvent is selected, the compounds can be separated by addition of water. Since the by-products are frequently water-soluble, the compounds are often obtained in high purity.

As example of specific active compounds according to the invention, there are mentioned:
- 3-methyl-4-amino-6-methyl-1,2,4-triazine-5-one,
- 3-ethyl-4-amino-6-methyl-1,2,4-triazine-5-one,
- 3-n-propyl-4-amino-6-methyl-1,2,4-triazine-5-one,
- 3-isopropyl-4-amino-6-methyl-1,2,4-triazine-5-one,
- 3-n-butyl-4-amino-6-methyl-1,2,4-triazine-5-one,
- 3-isobutyl-4-amino-6-methyl-1,2,4-triazine-5-one,
- 3-sec.-butyl-4-amino-6-methyl-1,2,4-triazine-5-one,
- 3-tert.-butyl-4-amino-6-methyl-1,2,4-triazine-5-one,
- 3-cyclohexyl-4-amino-6-methyl, 1,2,4-triazine-5-one,
- 3-phenyl-4-amino-6-methyl-1,2,4-triazine-5-one,
- 3-methyl-4-amino-6-ethyl-1,2,4-triazine-5-one,
- 3-ethyl-4-amino-6-ethyl-1,2,4-triazine-5-one,
- 3-n-propyl-4-amino-6-ethyl-1,2,4-triazine-5-one,
- 3-iso-propyl-4-amino-6-ethyl-1,2,4-triazine-5-one,
- 3-n-butyl-4-amino-6-ethyl-1,2,4-triazine-5-one,
- 3-iso-butyl-4-amino-6-ethyl-1,2,4-triazine-5-one,
- 3-sec.-butyl-4-amino-6-ethyl-1,2,4-triazine-5-one,
- 3-tert.-butyl-4-amino-6-methyl-1,2,4-triazine-5-one,
- 3-cyclohexyl-4-amino-6-methyl-1,2,4-triazine-5-one,
- 3-phenyl-4-amino-6-methyl-1,2,4-triazine-5-one,
- 3-methyl-4-amino-6-n-propyl-1,2,4-triazine-5-one,
- 3-ethyl-4-amino-6-n-propyl-1,2,4-triazine-5-one,
- 3-n-propyl-4-amino-6-n-propyl-1,2,4-triazine-5-one,
- 3-iso-propyl-4-amino-6-n-propyl-1,2,4-triazine-5-one,
- 3-n-butyl-4-amino-6-n-propyl-1,2,4-triazine-5-one,
- 3-iso-butyl-4-amino-6-n-propyl-1,2,5-triazine-5-one,
- 3-sec.-butyl-4-amino-6-n-propyl-1,2,5-triazine-5-one,
- 3-tert.-butyl-4-amino-6-n-propyl-1,2,5-triazine-5-one,
- 3-cyclohexyl-4-amino-6-n-propyl-1,2,4-triazine-5-one,
- 3-phenyl-4-amino-6-n-propyl-1,2,4-triazine-5-one,
- 3-methyl-4-amino-6-iso-propyl-1,2,4-triazine-5-one,
- 3-ethyl-4-amino-6-iso-propyl-1,2,4-triazine-5-one,
- 3-n-propyl-4-amino-6-iso-propyl-1,2,4-triazine-5-one,
- 3-iso-propyl-4-amino-6-iso-propyl-1,2,4-triazine-5-one,
- 3-n-butyl-4-amino-6-iso-propyl-1,2,4-triazine-5-one,
- 3-iso-butyl-4-amino-6-iso-propyl-1,2,4-triazine-5-one, 3-sec.-butyl-4-amino-6-iso-propyl-1,2,4-triazine-5-one,
3-tert.-butyl-4-amino-6-iso-propyl-1,2,4-triazine-5-one,
3-cyclohexyl-4-amino-6-iso-propyl-1,2,4-triazine-5-one,
3-phenyl-4-amino-6-iso-propyl-1,2,4-triazine-5-one,
3-methyl-4-amino-6-cyclohexyl-1,2,4-triazine-5-one,
3-ethyl-4-amino-6-cyclohexyl-1,2,4-triazine-5-one,
3-n-propyl-4-amino-6-cyclohexyl-1,2,4-triazine-5-one,
3-iso-propyl-4-amino-6-cyclohexyl-1,2,4-triazine-5-one,
3-n-butyl-4-amino-6-cyclohexyl-1,2,4-triazine-5-one,
3-iso-butyl-4-amino-6-cyclohexyl-1,2,4-triazine-5-one,
3-sec.-butyl-4-amino-6-cyclohexyl-1,2,4-triazine-5-one,
3-tert.-butyl-4-amino-6-cyclohexyl-1,2,4-triazine-5-one,
3-cyclohexyl-4-amino-6-cyclohexyl-1,2,4-triazine-5-one,
3-phenyl-4-amino-6-cyclohexyl-1,2,4-triazine-5-one,
3-ethyl-4-amino-6-tert.-butyl-1,2,4-triazine-5-one,
3-iso-propyl-4-amino-6-tert.-butyl-1,2,4-triazine-5-one,
3-iso-butyl-4-amino-6-tert.-butyl-1,2,4-triazine-5-one,
3-sec.-butyl-4-amino-6-tert.butyl-1,2,4-triazine-5-one,
3-tert.-butyl-4-amino-6-tert.-butyl-1,2,4-triazine-5-one,
3-trifluoromethyl-4-amino-6-tert.-butyl-1,2,4-triazine-5-one,
3-ethyl-4-methylamino-6-tert.-butyl-1,2,4-triazine-5-one,
3-ethyl-4-dimethylamino-6-tert.-butyl-1,2,4-triazine-5-one,
3-ethyl-4-amino-6-phenyl-1,2,4-triazine-5-one,
3-ethyl-4-methylamino-6-phenyl-1,2,4-triazine-5-one,
3-ethyl-4-dimethylamino-6-phenyl-1,2,4-triazine-5-one,
3-ethyl-4-dimethylamino-6-phenyl-1,2,4-triazine-5-one,
3-iso-propyl-4-amino-6-phenyl-1,2,4-triazine-5-one,
3-n-propyl-4-amino-6-phenyl-1,2,4-triazine-5-one,
3-iso-butyl-4-amino-6-phenyl-1,2,4-triazine-5-one,
3-cyclopronyl-4-amino-6-phenyl-1,2,4-triazine-5-one,
3-cyclohexyl-4-amino-6-phenyl-1,2,4-triazine-5-one,
3-phenyl-4-amino-6-phenyl-1,2,4-triazine-5-one,
3-cyclohexyl-4-amino-6-(4-chlorophenyl)-1,2,4-triazine-5-one.

The following examples are illustrative of this invention, both with respect to the preparation of starting materials (II) and the ultimate products (I), as well as of the process of the invention.

EXAMPLE 1

Preparation of
3-ethyl-4-amino-6-tert.-butyl-1,2,4-triazine-5-one

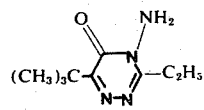 (Compound 2)

42.8 g (0.2 mol) of tert.butylglyoxylic acid methyl ester 2-propionyl-hydrazone were dissolved in 300 ml of pyridine which had been dried over potassium hydroxide, and 18.0 g of hydrazine hydrate which had been dried over potassium hydroxide were added. Stirring was effected at 20°C for 15 minutes followed by heating to boiling temperature within 30 minutes and boiling under reflux for 4 hours. Concentration in a vacuum was then effected; the residue was stirred together with 300 ml of water, followed by suction filtration and drying. There were obtained 21.6 g (55% of the theoretical amount) of 3-ethyl-4-amino-6-tert.-butyl-1,2,4-triazine-5-one in colourless crystals of the m.p. 152°C. After recrystallization from a little methanol, the melting point was 154°C.

The tert.-butylglyoxylic acid methyl ester 2-propionylhydrazone used as starting product was prepared in the following manner:

138 g (0.96 mol) of tert.-butylglyoxylic acid methyl ester (b.p. 54° – 55°/13 mm) and 82 g (0.93 mol) of propionylhydrazine with 1.5 g of p- toluenesulphonic acid in 120 ml methanol were boiled under reflux for 5 minutes. Concentration was then effected and residues of the solvent were drawn off at 90°/0.01 mm Hg. There were obtained 193 g (97%) of an oily residue which, for purification, was taken up in 1 liter of petroleum ether. Stirring together with 5 g of activated charcoal was effected, followed by filtration and cooling to −70°C. The precipitate was filtered off with suction and washed with a little cold petroleum ether. There were obtained 168 g (84% of theory) of hydrazone of m.p. 28° – 29°C.

EXAMPLE 2

Preparation of
3-cyclohexyl-4-amino-6-phenyl-1,2,4-triazine-5-one

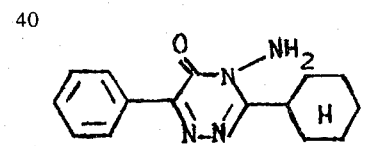 (Compound 3)

28.8 g (0.1 mol) of phenylglyoxylic acid methyl ester 2-hexahydrobenzoylhydrazine and 10 g of hydrazine hydrate (0.2 mol) in 100 ml of pyridine which had been dried over potassium hydroxide were stirred for 45 minutes at 100°C and then cooled.

The mixture solidifies into a pulp, 100 ml of water were added; stirring was effected for some hours, followed by suction filtration. After washing out with water and drying, there were obtained 5.3 g (19.7% of the theory) 3-cyclohexyl-4-amino-6-phenyl-1,2,4-triazine-5-one in colourless flakes of the melting point 178° – 180°C.

The phenylglyoxylic acid methyl ester 2-hexahydrobenzoylhydrazone used as starting product was obtained in the following manner:

16.4 g (0.1 mol) phenylglyoxylic acid methyl ester were dissolved in 250 ml methanol, and 14.2 g (0.1 mol) hexahydrobenzoylhydrazine were added. After addition of 0.2 g p-toluene-sulphonic acid, boiling was effected for 15 minutes, followed by cooling with ice.

The precipitate was filtered off with suction, washed with cold methanol, washed and dried. There were obtained 20.4 g (71% of the theory) of hydrazone of the melting point 119° – 121°C.

EXAMPLE 3

In analogous manner, the compounds identified in the Table below are prepared. The Table shows the meanings of $R_1$, $R_2$, $R_3$ and $R_4$ in formula (I).

| Compound | $R_1$ | $R_2$ | $R_3$ | $R_4$ | m.p.(°C) |
|---|---|---|---|---|---|
| 1 | $i-C_3H_7$ | H | H | $C(CH_3)_3$ | 140–141 |
| 4 | H | H | H | $C(CH_3)_3$ | 113–114 |
| 5 | $CH_3$ | H | H | $C(CH_3)_3$ | 158–159 |
| 6 | cyclo–$C_6H_{11}$ | H | H | $C(CH_3)_3$ | 175–180 |
| 7 | $i-C_3H_7$ | H | H | phenyl | 121–122 |
| 8 | $n-C_3H_7$ | H | H | $t-C_4H_9$ | 105–106 |
| 9 | $n-C_4H_9$ | H | H | $t-C_4H_9$ | 94–96 |
| 10 | $i-C_4H_9$ | H | H | $t-C_4H_9$ | 140–2 |
| 11 | $sec-C_4H_9$ | H | H | $t-C_4H_9$ | 86–90 |
| 12 | $t-C_4H_9$ | H | H | $t-C_4H_9$ | 165,5 |
| 13 | $n-C_6H_{13}$ | H | H | $t-C_4H_9$ | 40–42 |
| 14 | cyclo–$C_5H_9$ | H | H | $t-C_4H_9$ | 197 |
| 15 | cyclo–$C_3H_5$ | H | H | $t-C_4H_9$ | 109–110 |
| 16 | $C_6H_5$ | H | H | $t-C_4H_9$ | 126–7 |
| 17 | $C_6H_5-(CH_2)_2-$ | H | H | $t-C_4H_9$ | 90 |
| 18 | $N\equiv C-CH_2-$ | H | H | $t-C_4H_9$ | 156–7 |
| 19 | $C_2H_5O-CH_2-$ | H | H | $t-C_4H_9$ | 64–7 |
| 20 | $C_2H_5$ | H | H | $C_6H_5$ | 164–5 |
| 21 | $CH_3$ | H | H | $C_6H_5$ | 167–9 |
| 22 | $CH_3$ | H | H | $4-Cl-C_6H_4$ | 97 |
| 23 | $CH_3$ | H | H | $3-CH_3-C_6H_4$ | 107 |
| 24 | $CH_3$ | H | H | $4-CH_3-C_6H_4$ | 199 |
| 25 | $CH_3$ | H | H | $4-t-C_4H_9C_6H_4$ | 141 |
| 26 | $CH_3$ | H | H | $4-CH_3O-C_6H_4$ | 206 |
| 27 | $CH_3$ | H | H | $3,4-(CH_3O)_2-C_6H_3$ | 220 |
| 28 | $CH_3$ | H | H | $4-CH_3S-C_6H_4-$ | 209 |
| 29 | $C_2H_5$ | H | H | $4-Cl-C_6H_4-$ | 156 |
| 30 | $C_2H_5$ | H | H | $3-CH_3-C_6H_4-$ | 108 |
| 31 | $C_2H_5$ | H | H | $4-CH_3-C_6H_4$ | 148 |
| 32 | $C_2H_5$ | H | H | $4-t-C_4H_9-C_6H_4$ | 133 |
| 33 | $C_2H_5$ | H | H | $4-CH_3O-C_6H_4$ | 166 |
| 34 | $C_2H_5$ | H | H | $3,4-(Ch_3O)_2C_6H_3$ | 167 |
| 35 | $C_2H_5$ | H | H | $4-CH_3S-C_6H_4-$ | 178 |
| 36 | $C_2H_5$ | H | H | $4-NO_2-C_6H_4$ | 180 |
| 37 | $C_2H_5$ | H | H | $3-CF_3-C_6H_4$ | 132 |
| 38 | $n-C_3H_7$ | H | H | $i-C_3H_7$ | 95,5 |
| 39 | $n-C_3H_7$ | H | H | $C_6H_5$ | 104–106 |
| 40 | $n-C_3H_7$ | H | H | $4-Cl-C_6H_4$ | 120,5 |
| 41 | $i-C_3H_7$ | H | H | $4-Cl-C_6H_4$ | 145–147 |
| 42 | $i-C_3H_7$ | H | H | $3-CH_3-C_6H_4$ | 99 |
| 43 | $i-C_3H_7$ | H | H | $4-CH_3-C_6H_4$ | 120 |
| 44 | $i-C_3H_7$ | H | H | $4-t-C_4H_9-C_6H_4$ | 167 |
| 45 | $i-C_3H_7$ | H | H | $4-CH_3O-C_6H_4$ | 132 |
| 46 | cyclo–$C_3H_5$ | H | H | $C_6H_5$ | 121 |
| 47 | cyclo–$C_3H_5$ | H | H | $4-Cl-C_6H_4$ | 161,5 |
| 48 | cyclo–$C_3H_5$ | H | H | $4-CH_3-C_6H_4$ | 145 |
| 49 | $n-C_4H_9$ | H | H | $C_6H_5$ | 138–9 |
| 50 | $n-C_4H_9$ | H | H | $4-Cl-C_6H_4$ | 152–3 |
| 51 | $i-C_4H_9$ | H | H | $C_6H_5$ | 104–5 |
| 52 | $sec-C_4H_9$ | H | H | $C_6H_5$ | 92 |
| 53 | $t-C_4H_9$ | H | H | $C_6H_5$ | 138 |
| 54 | $t-C_4H_9$ | H | H | $4-Cl-C_6H_4$ | 179–181 |
| 55 | cyclo–$C_6H_{11}$ | H | H | $4-Cl-C_6H_4$ | 180–1 |
| 56 | $C_6H_5$ | H | H | $C_6H_5$ | 176–7 |
| 57 | $4-Cl-C_6H_4$ | H | H | $C_6H_5$ | 195 |
| 58 | $3,4-(Cl)_2-C_6H_3$ | H | H | $C_6H_5$ | 210–12 |
| 59 | $CH_3$ | H | $CH_3$ | $t-C_4H_9$ | 90 |
| 60 | $CH_3$ | H | $CH_3$ | $C_6H_5$ | 120 |
| 61 | $CH_3$ | H | $CH_3$ | $4-CH_3S-C_6H_4$ | 214–16 |
| 62 | $C_2H_5$ | H | $CH_3$ | $t-C_4H_9$ | 116 |
| 63 | $C_2H_5$ | H | $CH_3$ | $C_6H_5$ | 76 |
| 64 | $C_2H_5$ | H | $CH_3$ | $4-CH_3-C_6H_4$ | 146 |
| 65 | $C_2H_5$ | H | $CH_3$ | $4-NO_2-C_6H_4$ | 175 |
| 66 | $i-C_3H_7$ | H | $CH_3$ | $4-CH_3-C_6H_4$ | 91 |
| 67 | $CH_3$ | H | $C_6H_5$ | $C_6H_5$ | 204 |
| 68 | $CH_3$ | H | H | $4-NO_2-C_6H_4$ | 233 |
| 69 | $CH_3$ | H | H | $3-CF_3-C_6H_4$ | 169 |
| 70 | $C_2H_5$ | H | H | $3-Cl-C_6H_4$ | 154 |
| 71 | $C_2H_5$ | H | H | $4-CH_3SO_2-C_6H_4-$ | 188 |
| 72 | $i-C_3H_7$ | H | H | $3-CF_3-C_6H_4$ | 119 |
| 73 | $n-C_5H_{11}$ | H | H | $C_6H_5$ | 123–4 |
| 74 | $(CH_3)_2-CH-(CH_2)-$ | H | H | $C_6H_5$ | 141–3 |
| 75 | $n-C_6H_{13}$ | H | H | $C_6H_5$ | 129–132 |
| 76 | $CH_3$ | H | $CH_3$ | $4-NO_2-C_6H_4$ | 193 |
| 77 | $CH_3$ | H | $CH_3$ | $3-CF_3-C_6H_4$ | 141 |
| 78 | $C_2H_5$ | H | $CH_3$ | $3-Cl-C_6H_4$ | 93 |
| 79 | $C_2H_5$ | H | $CH_3$ | $3-CF_3-C_6H_4$ | 83 |
| 80 | $(CH_3)_2CH-(CH_2)-$ | H | $Ch_3$ | $C_6H_5$ | 80 |
| 81 | $n-C_6H_{13}$ | H | $CH_3$ | $C_6H_5$ | 82 |
| 82 | $CH_3$ | H | $HO-CH_2-CH_2$ | $C_6H_5$ | 84 |
| 83 | $C_2H_5$ | H | $HO-CH_2-CH_2$ | $C_6H_5$ | 111 |

Continued

| Compound | $R_1$ | $R_2$ | $R_3$ | $R_4$ | m.p.(°C) |
| --- | --- | --- | --- | --- | --- |
| 84 | $C_2H_5$ | H | $HO-CH_2-CH_2$ | $3-Cl-C_6H_4$ | 124 |
| 85 | $i-C_3H_7$ | H | $HO-CH_2-CH_2$ | $4-t-C_4H_9-C_6H_4$ | 210 |
| 86 | $C_2H_5$ | H | $F_3C-CH_2$ | $C_6H_5$ | 118 |
| 87 | $i-C_3H_7$ | H | $CH_3$ | $t-C_4H_9$ | 118–9 |
| 88 | $i-C_3H_7$ | H | $F_3C-CH_2$ | $t-C_4H_9$ | 104–5 |
| 89 | $t-C_4H_9$ | H | $CH_3$ | $t-C_4H_9$ | 106–7 |

The new 4-amino-1,2,4-triazine-5-ones of the invention have herbicidal properties and can therefore be used for the control of weeds.

By weeds in the widest sense are meant all plants which grow in places where they are not desired. Whether the active compounds according to the invention act as total or selective herbicidal agents on the magnitude of the applied amount of active compound.

The active compounds according to the invention can be used for example in the case of the following plants: dicotyledons such as mustard (Sinapis), cress (Lepidium), catchweed (Galium), chickweed (Stellaria), chamomile (Matricaria), gallant soldier (Galinsoga), goosefoot (Chenopodium), annual nettle (Urtica), groundsel (Senecio), cotton (Gossypium), beets (Beta), carrots (Daucus), beans (Phaseolus); monocotyledons, such as timothy (Phleum), bluegrass (Poa), fescue (Festuca), goosegrass (Eleusine), foxtail (Setaria), ryegrass (Lolium), cheat (Bromus), barnyard grass (Echinochloa), maize (Zea), rice (Oryza), oats (Avena), barley (Hordeum), wheat (Triticum), millet (Panicum), sugar cane (Saccharum).

The active compounds according to the present invention can be converted into the usual formulations, such as solutions, emulsions, suspensions, powders, pastes and granulates. These may be produced in known manner, for example by mixing the active compounds with extenders, that is, liquid or solid or liquefied gaseous diluents or carriers, optionally with the use of surface-active agents, that is, emulsifying agents and/or dispersing agents. In the case of the use of water as an extender, organic solvents can, for example, also be used as auxiliary solvents.

As liquid diluents or carriers, there are preferably used aromatic hydrocarbons, such as xylenes, toluene, benzene or alkyl naphthalenes, chlorinated aromatic or aliphatic hydrocarbons, such as chlorobenzenes, chloroethylenes or methylene chloride, aliphatic hydrocarbons, such as cyclohexane or paraffins, for example mineral oil fractions, alcohols, such as butanol or glycol as well as their ethers and esters, ketones, such as acetone, methyl ethyl ketone, methyl isobutyl ketone or cyclohexanone, or strongly polar solvents, such as dimethyl formamide, dimethyl sulphoxide or acetonitrile, as well as water.

By liquefied gaseous diluents or carriers are meant liquids which would be gaseous at normal temperatures and pressures, e.g. aerosol propellants, such as halogenated hydrocarbons, e.g. freon.

As solid diluents or carriers, there are preferably used ground natural minerals, such as kaolins, clays, talc, chalk, quartz, attapulgite, montmorillonite or diatomaceous earth, or ground synthetic minerals, such as highly-dispersed silicic acid, alumina or silicates.

Preferred examples of emulsifying agents include nonionic and anionic emulsifiers, such as polyoxyethylene-fatty acid esters, polyoxyethylene-fatty alcohol ethers, for example alkylarylpolyglycol ethers, sulphonates, alkyl sulphates and aryl sulphonates; and preferred examples of dispersing agents include lignin, sulphite waste liquors and methyl cellulose.

The active compounds according to the invention may be present in the formulations in admixture with each other or with other active compounds. The formulations contain, in general, from 0.1 to 95, preferably 0.5 to 90, percent by weight of active compound.

The active compounds may be applied as such or in the form of their formulations or the application forms prepared therefrom, such as ready-to-use solutions, emulsions, suspensions, powders, pastes and granulates. Application may take place in the usual manner, for example by dusting, spraying, squirting, watering and scattering.

The compositions may be diluted for actual application. The amount of active compound applied may vary within a fairly wide range. It depends essentially on the nature of the desired effect. In general, the applied amounts are from 0.1 to 20 kg of active compound per hectare, preferably 0.2 to 15 kg per hectare.

The invention therefore provides a herbicidal composition containing as active ingredient a compound according to the invention in admixture with a solid or liquefied gaseous diluent or carrier or in admixture with a liquid diluent or carrier containing a surface-active agent.

The invention also provides a method of combating weeds which comprises applying to the weeds or a habitat thereof a compound according to the invention alone or in the form of a composition containing as active ingredient a compound according to the invention in admixture with a diluent or carrier.

The herbicidal composition and use aspects of the invention are illustrated by the following Examples.

EXAMPLE A

Pre-emergence test
Solvent: 5 parts by weight acetone
Emulsifier: 1 part by weight alkylarylpolyglycol ether To produce a suitable preparation of active compound, 1 part by weight of active compound was mixed with the stated amount of solvent, the stated amount of emulsifier was added and the concentrate was then diluted with water to the desired concentration.

Seeds of the test plants were sown in normal soil and, after 24 hours, watered with the preparation of the active compounds. It was expedient to keep constant the amount of water per unit area. The concentration of the active compound in the preparation was of no importance; only the amount of active compound applied per unit area was decisive. After three weeks, the degree of damage to the test plants was determined and characterized by the values 0–5, which have the following meaning:

0 no effect
1 slight damage or delay in growth
2 marked damage or inhibition of growth
3 heavy damage and only deficient development or only 50% emerged
4 plants partially destroyed after germination or only 25% emerged
5 plants completely dead or not emerged.

The active compounds, the amounts applied and the results obtained can be seen from Table A.

TABLE A

| Active compound | Active compound applied kg/hectare | Pre-emergence test | | | | | | | | | | |
|---|---|---|---|---|---|---|---|---|---|---|---|---|
| | | Echinochloa | Chenopodium | Sinapis | Stellaria | Lolium | Galinsoga | Matricaria | Oats | Cotton | Wheat | Maize |
| 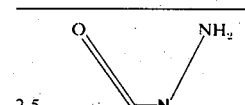 Compound 1 | 10 | 5 | 5 | 5 | 5 | 5 | 5 | 5 | 5 | 4–5 | 4–5 | 4–5 |
| | 5 | 5 | 5 | 5 | 5 | 5 | 5 | 5 | 5 | 4 | 4–5 | 4 |
| | 2.5 | 5 | 5 | 5 | 5 | 5 | 4–5 | 5 | 4 | 4–5 | 4 | |
| | 1.25 | 5 | 5 | 5 | 5 | 5 | 4–5 | 4–5 | 5 | 3–4 | 4–5 | 3–4 |
| | 0.625 | 4–5 | 5 | 4–5 | 5 | 5 | 4–5 | 4–5 | 4 | 3 | 3–4 | 3 |
| 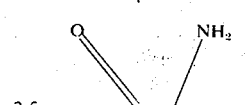 Compound 2 | 10 | 5 | 5 | 5 | 5 | 4–5 | 5 | 5 | 4–5 | 3 | 4 | |
| | 5 | 5 | 5 | 5 | 5 | 5 | 4–5 | 4–5 | 5 | 4–5 | 2 | 4 |
| | 2.5 | 5 | 5 | 5 | 5 | 4–5 | 4–5 | 5 | 4–5 | 2 | 3 | |
| | 1.25 | 5 | 5 | 5 | 5 | 4–5 | 4–5 | 4–5 | 5 | 4–5 | 2 | 3 |
| | 0.625 | 5 | 5 | 5 | 5 | 4 | 4–5 | 4–5 | 5 | 4 | 2 | 2 |

| Active Compound | Active compound applied kg/ha | Pre-emergence test | | | | | | | | | |
|---|---|---|---|---|---|---|---|---|---|---|---|
| | | Echinochloa | Sinapis | Stellaria | Galinsoga | Matricaria | Sugar beets | Oats | Cotton | Wheat | Maize |
| 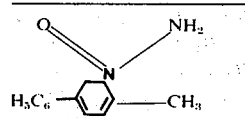 | 5 | 4–5 | 5 | 4 | 4–5 | 5 | 0 | 4 | 1 | 3 | 1 |
| | 2.5 | 4 | 4 | 4 | 4 | 4–5 | 0 | 3 | 0 | 2 | 0 |
| 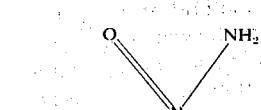 | 5 | 5 | 5 | 3 | 5 | 4–5 | 2 | 3 | 3 | 0 | 3 |
| | 2.5 | 5 | 4 | 2 | 4 | 4 | 1 | 3 | 2 | 0 | 2 |
| 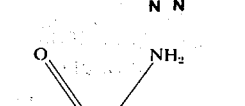 | 5 | 4 | 5 | 5 | 5 | 5 | 5 | 4 | 2 | 4 | 1 |
| 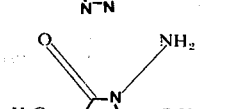 | 5 | 4–5 | 5 | 5 | 5 | 5 | 4 | 3 | 3 | 2 | 1 |
| | 2.5 | 4 | 5 | 4–5 | 5 | 5 | 3 | 2 | 3 | 1 | 0 |
| 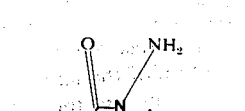 | 5 | 4–5 | 5 | 5 | 5 | 5 | 5 | 5 | 4 | 4–5 | 4 |
| | 2.5 | 4 | 5 | 4–5 | 5 | 5 | 4–5 | 3 | 4–5 | 4 | |
| 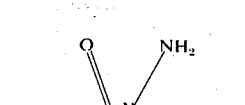 | 5 | 4 | 4–5 | 2 | 5 | 5 | 5 | 1 | 2 | 1 | 2 |
| | 2.5 | 4 | 4 | 1 | 5 | 4–5 | 5 | 0 | 1 | 0 | 2 |

EXAMPLE B

Post-emergence test
Solvent: 5 parts by weight acetone
Emulsifier: 1 part by weight alkylarylpolyglycol ether To produce a suitable preparation of active compound, 1 part by weight of active compound is mixed with the stated amount of solvent; the stated amount of emulsifier is added and the concentrate is then diluted with water to the desired concentration.

Test plants which have a height of 5–15 cm are sprayed with the preparation of the active compound so that the amounts of active compound per unit area which are stated in the Table are applied. Depending on the concentration of the spray liquor, the amount of water applied lies between 1000 and 2000 litres/hectare. After three weeks, the degree of damage to the plants is determined and characterised by the values 0–5, which have the following meaning:

0 no effect
1 a few slightly burnt spots
2 marked damage to leaves
3 some leaves and parts of stalks partially dead
4 plant partially destroyed
5 plant completely dead.

The active compounds, the amounts applied and the results can be seen from Table B.

Table B

| Active compound | Active compound applied kg/hectare | Post-emergence test Echinochloa | Chenopodium | Sinapis | Oats | Cotton | Wheat | Beans |
|---|---|---|---|---|---|---|---|---|
| 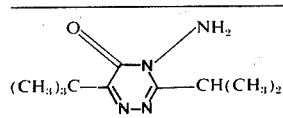 Compound 1 | 2 | 5 | 5 | 5 | 5 | 5 | 5 | 5 |
| | 1 | 5 | 5 | 5 | 4–5 | 5 | 5 | 5 |
| | 0.5 | 5 | 5 | 5 | 4–5 | 5 | 4–5 | 4–5 |
| | 0.25 | 4–5 | 5 | 5 | 3 | 4–5 | 3 | 4 |
| | 0.125 | 4–5 | 5 | 5 | 2 | 4 | 2 | 3–4 |
| 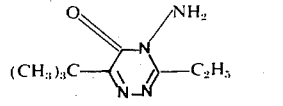 Compound 2 | 2 | 5 | 5 | 5 | 5 | 5 | 5 | 5 |
| | 1 | 5 | 5 | 5 | 5 | 5 | 5 | 5 |
| | 0.5 | 5 | 5 | 5 | 5 | 5 | 4–5 | 5 |
| | 0.25 | 5 | 4–5 | 5 | 4–5 | 5 | 4–5 | 5 |
| | 0.125 | 4–5 | 4–5 | 5 | 4–5 | 5 | 4 | 4 |

| Active compound | Active compound applied kg/ha | Pre-emergence test Echinochloa | Sinapis | Sugar beets | Oats | Cotton | Wheat |
|---|---|---|---|---|---|---|---|
| 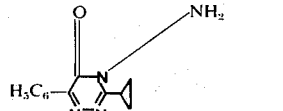 | 4 | 5 | 5 | 5 | 5 | 5 | 5 |
| | 2 | 5 | 5 | 5 | 5 | 5 | 5 |
| | 1 | 5 | 5 | 5 | 4–5 | 5 | 5 |
| 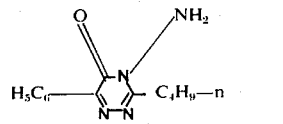 | 4 | 5 | 5 | 5 | 5 | 5 | 5 |
| | 2 | 5 | 5 | 5 | 4 | 5 | 4–5 |
| | 1 | 5 | 5 | 5 | 3 | 4 | 3 |
| 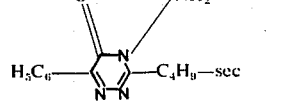 | 4 | 5 | 5 | 5 | 5 | 5 | 5 |
| | 2 | 5 | 5 | 5 | 4 | 5 | 5 |
| | 1 | 5 | 5 | 5 | 4 | 4–5 | 3 |
| 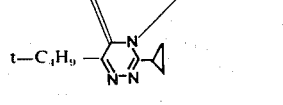 | 4 | 5 | 5 | 5 | 5 | 5 | 5 |
| | 2 | 5 | 5 | 5 | 5 | 5 | 5 |
| | 1 | 5 | 5 | 5 | 5 | 5 | 5 |
| 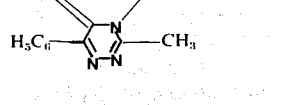 | 4 | 4–5 | 5 | 1 | 4–5 | 2 | 3 |
| | 2 | 4 | 5 | 0 | 4 | 1 | 2 |
| | 1 | 2 | 4 | 0 | 2 | 0 | 2 |

Table B—Continued

| Active compound | Active compound applied kg/ha | Post-emergence test Echinochloa | Sinapis | Sugar beets | Oats | Cotton | Wheat |
|---|---|---|---|---|---|---|---|
| 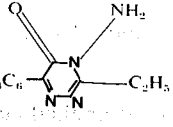 | 4 | 5 | 5 | 5 | 5 | 3 | 4 |
|  | 2 | 4 | 5 | 5 | 4 | 3 | 3 |
|  | 1 | 3 | 5 | 5 | 3 | 2 | 3 |
| 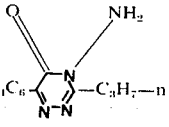 | 4 | 5 | 5 | 5 | 5 | 3 | 3 |
|  | 2 | 4 | 5 | 5 | 4 | 3 | 3 |
|  | 1 | 3 | 5 | 5 | 3 | 2 | 2 |

It will be understood that the specification and examples are illustrative but not limitative of the present invention and that other embodiments within the spirit and scope of the invention will suggest themselves to those skilled in the art.

What is claimed is:

1. Herbicidal compositions comprising a herbicidally acceptable carrier and, as an active ingredient, from 0.1 to 95% of a 4-amino-1,2,4-triazine-5-one compound of the formula:

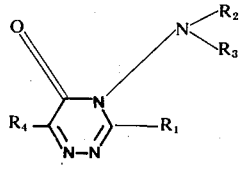

(I)

in which $R_1$ and $R_4$, which may be the same or different, are hydrogen, alkyl of from 1 to 6 carbon atoms, trifluoromethyl, cycloalkyl of from 3 to 12 ring carbon atoms, phenyl, halophenyl, trifluoromethylphenyl, nitrophenyl, alkylthiophenyl, alkylsulfonylphenyl, cyanalkyl, alkoxyalkyl, alkylphenyl or alkoxyphenyl of from 1 to 4 carbon atoms in the alkyl or alkoxy moiety, or phenylalkyl of from 1 to 3 carbon atoms in the alkyl moiety, $R_2$ is hydrogen or alkyl of from 1 to 4 carbon atoms; and $R_3$ is hydrogen, alkyl from 1 to 4 carbon atoms, phenyl, haloalkyl, trifluoromethylalkyl, hydroxyalkyl, or phenylalkyl of from 1 to 3 carbon atoms in the alkyl moiety, or alkylphenyl, alkoxyphenyl or alkylmercaptophenyl of from 1 to 4 carbon atoms in the alkyl moiety.

2. Method of combating undesired vegetation which comprises applying herbicidally effective amounts of a 4-amino-1,2,4-triazine-5-one compound of the formula in which $R_1$ and $R_4$, which may be the same or different, are hydrogen, alkyl of from 1 to 6 carbon atoms, trifluoromethyl, cycloalkyl of from 3 to 6 ring carbon atoms, phenyl, halophenyl or alkylphenyl or alkoxyphenyl of from 1 to 4 carbon atoms in the alkyl or alkoxy moiety, or phenylalkyl of from 1 to 3 carbon atoms in the alkyl moiety, $R_2$ is hydrogen or alkyl of from 1 to 4 carbon atoms; and $R_3$ is hydrogen, alkyl of from 1 to 4 carbon atoms, phenyl, haloalkyl, phenylalkyl of from 1 to 3 carbon atoms in the alkyl moiety, or alkylphenyl, alkoxyphenyl or alkylmercaptophenyl of from 1 to 4 carbon atoms in the alkyl moiety.

3. Method as claimed in claim 2 wherein said compound is selected from the group consisting of
3-ethyl-4-amino-6-tert.-butyl-1,2,4-triazine-5-one
3-cyclohexyl-4-amino-6-phenyl-1,2,4-triazine-5-one
3-isopropyl-4-amino-6-tert.-butyl-1,2,4-triazine-5-one
4-amino-6-tert.-butyl-1,2,4-triazine-5-one.
3-methyl-4-amino-6-tert.-butyl-1,2,4-triazine-5-one
3-cyclohexyl-4-amino-6-tert.-butyl-1,2,4-triazine-5-one
3-isopropyl-4-amino-6-phenyl-1,2,4-triazine-5-one.

4. Method as claimed in claim 2 wherein $R_1$ in the formula is hydrogen.

5. Method as claimed in claim 2 wherein $R_1$ in the formula is alkyl of from 2 to 4 carbon atoms.

6. Method as claimed in claim 2 wherein $R_1$ in the formula is trifluoromethyl.

7. Method as claimed in claim 2 wherein $R_1$ in the formula is cycloalkyl of either 3 or 6 ring carbon atoms.

8. Method as claimed in claim 2 wherein $R_1$ in the formula is phenyl or substituted phenyl wherein the substituents are halogen-alkyl of from 1 to 4 carbon atoms, or alkoxy of from 1 to 4 carbon atoms.

9. Method as claimed in claim 2 wherein $R_1$ in the formula is phenylalkyl of from 1 to 3 carbon atoms in the alkyl moiety.

10. Method as claimed in claim 2 wherein $R_2$ in the formula is hydrogen.

11. Method as claimed in claim 2 wherein $R_2$ in the formula is alkyl of from 1 to 4 carbon atoms.

12. Method as claimed in claim 2 wherein $R_3$ in the formula is hydrogen.

13. Method as claimed in claim 2 wherein $R_3$ in the formula is alkyl of from 1 to 4 carbon atoms.

14. Method as claimed in claim 2 wherein $R_3$ in the formula is haloalkyl of from 1 to 4 carbon atoms.

15. Method as claimed in claim 2 wherein $R_3$ in the formula is phenylalkyl of from 1 to 3 carbon atoms in the alkyl moiety.

16. Method as claimed in claim 2 wherein $R_3$ in the formula is phenyl.

17. Method as claimed in claim 2 wherein $R_3$ in the formula is substituted phenyl wherein the substituent is alkyl, alkoxy or alkylmercapto of from 1 to 4 carbon atoms in the alkyl moiety.

18. Method as claimed in claim 2 wherein $R_4$ in the formula is alkyl of from 1 to 4 carbon atoms.

19. Method as claimed in claim 2 wherein $R_4$ in the formula is phenyl.

20. Method as claimed in claim 2 wherein $R_4$ in the formula is cyclohexyl.

21. Method as claimed in claim 2 wherein said compound is designated 3-ethyl-4-amino-6-tert.-butyl-1,2,4-triazine-5-one.

22. Method as claimed in claim 2 wherein said compound is designated 3-cyclohexyl-4-amino-6-phenyl-1,2,4-triazine-5-one.

23. Method as claimed in claim 2 wherein said compound is designated 3-isopropyl-4-amino-6-tert.-butyl-1,2,4-triazine-5-one.

24. Method as claimed in claim 2 wherein said compound is designated 4-amino-6-tert.-butyl-1,2,4-triazine-5-one.

25. Method as claimed in claim 2 wherein said compound is designated 3-methyl-4-amino-6-tert.-butyl-1,2,4-triazine-5-one.

26. Method as claimed in claim 2 wherein said compound is designated 3-cyclohexyl-4-amino-6-tert.-butyl-1,2,4-triazine-5-one.

27. Method as claimed in claim 2 wherein said compound is designated 3-isopropyl-4-amino-6-phenyl-1,2,4-triazine-5-one.

28. Method as claimed in claim 2 wherein said compound is designated 3-methyl-4-amino-6-phenyl-1,2,4-triazine-5-one.

29. Herbicidal composition as claimed in claim 1 wherein said compound is selected from the group consisting of
3-ethyl-4-amino-6-tert.-butyl-1,2,4-triazine-5-one
3-cyclohexyl-4-amino-6-phenyl-1,2,4-triazine-5-one
3-isopropyl-4-amino-6-tert.-butyl-1,2,4-triazine-5-one
4-amino-6-tert.-butyl-1,2,4-triazine-5-one
3-methyl-4-amino-6-tert.-butyl-1,2,4-triazine-5-one
3-cyclohexyl-4-amino-6-tert.-butyl-1,2,4-triazine-5-one
3-isopropyl-4-amino-6-phenyl-1,2,4-triazine-5-one, and
3-methyl-4-amino-6-phenyl-1,2,4-triazine-one.

30. Composition as claimed in claim 1 wherein said compound is 3-ethyl-4-amino-6-tert.-butyl-1,2,4-triazine-5-one.

31. Composition as claimed in claim 1 wherein said compound is 3-methyl-4-amino-6-phenyl-1,2,4-triazine-5-one.

* * * * *